United States Patent [19]

Sa et al.

[11] Patent Number: 4,700,193
[45] Date of Patent: Oct. 13, 1987

[54] CROSS-POLARIZED ANTENNA

[75] Inventors: Norbert Sa, Burlington; William F. Miccioli, Acton; A. Robert Chinchillo, Saugus; John F. Toth, Reading, all of Mass.

[73] Assignee: Raytheon Company, Lexington, Mass.

[21] Appl. No.: 524,703

[22] Filed: Aug. 19, 1983

[51] Int. Cl.⁴ .............................................. G01S 5/02
[52] U.S. Cl. .................................. 342/427; 342/361; 342/80; 343/770
[58] Field of Search ................... 343/16 M, 361, 767, 343/770, 700 MS; 342/472, 361, 80

[56] References Cited

U.S. PATENT DOCUMENTS

| 3,757,344 | 9/1973 | Pereda | 343/770 |
| 4,196,436 | 4/1980 | Westerman | 343/770 |
| 4,197,545 | 4/1980 | Favaloro et al. | 343/700 MS |
| 4,417,248 | 11/1983 | Mathews | 343/16 M |

Primary Examiner—Theodore M. Blum
Attorney, Agent, or Firm—Philip J. McFarland

[57] ABSTRACT

A monopulse receiving arrangement is shown to comprise orthogonally polarized and electrically separate monopulse antenna arrays, one such array being made up of juxtaposed slotted waveguides and the other being made up of at least one monopulse array of dipoles printed on a dielectric material.

7 Claims, 5 Drawing Figures

CROSS-POLARIZED ANTENNA

BACKGROUND OF THE INVENTION

This invention pertains generally to phased array antennas for radar and in particular to antennas of such type wherein antenna elements are connected together to form a monopulse antenna with linear polarization.

It has been recognized that when a monopulse antenna with linear polarization is used in a guided missile during flight to determine the direction from which radio frequency signals arrive, the effect of any type of curved radome on the polarization of such signals may introduce unacceptably large error in the determination of such direction. Any type of radome now known subjects radio frequency signals passing through to "depolarization," meaning that the polarization of the radio frequency signals incident on the radome is altered. At best the effective amplitude of the radio frequency signals impinging on the antenna elements will be attenuated; at worst the direction indicated by the monopulse nulls will also differ from the true boresight direction of the monopulse antenna. In the worst condition, depolarization due to the effect of any practical radome may cause an unacceptably large error in the determination of direction to a target.

The problem is made almost insoluble when a so-called "cross-polarization" jammer is actuated. In such a situation the depolarization effect of the radome converts enough of the cross-polarized jamming signal to a signal having a polarization accepted by the monopulse antenna to cause an excessively large shift in the monopulse nulls, with the result that a correspondingly large error in the indicated direction of such a jammer is experienced.

SUMMARY OF THE INVENTION

With this background of the invention in mind, it is therefore a primary object of this invention to provide a means for reducing the susceptibility of missile seeker antennas to radome-induced depolarization effects, or to provide a means for correcting those radome-induced depolarization effects with minimal impact on the existing performance of the monopulse seeker antenna.

It is another object of this invention to provide a means for correcting for radome-induced depolarization effects in a monopulse antenna that fits within form-factored constraints.

The foregoing and other objects of this invention are generally attained by providing a capacitively coupled, horizontally polarized monopulse antenna having dipoles as elements mounted directly on top of a vertically polarized monopulse antenna having waveguide slots as elements, with the corresponding feed lines placed in selected areas of the aperture of the vertically polarized monopulse antenna to produce minimum interaction.

BRIEF DESCRIPTION OF THE DRAWINGS

Other objects and many of the attendant advantages of this invention will be readily appreciated as the same become better understood by reference to the following detailed description when considered in connection with the accompanying drawings, wherein.

DESCRIPTION OF THE PREFERRED EMBODIMENTS

Figure 1:
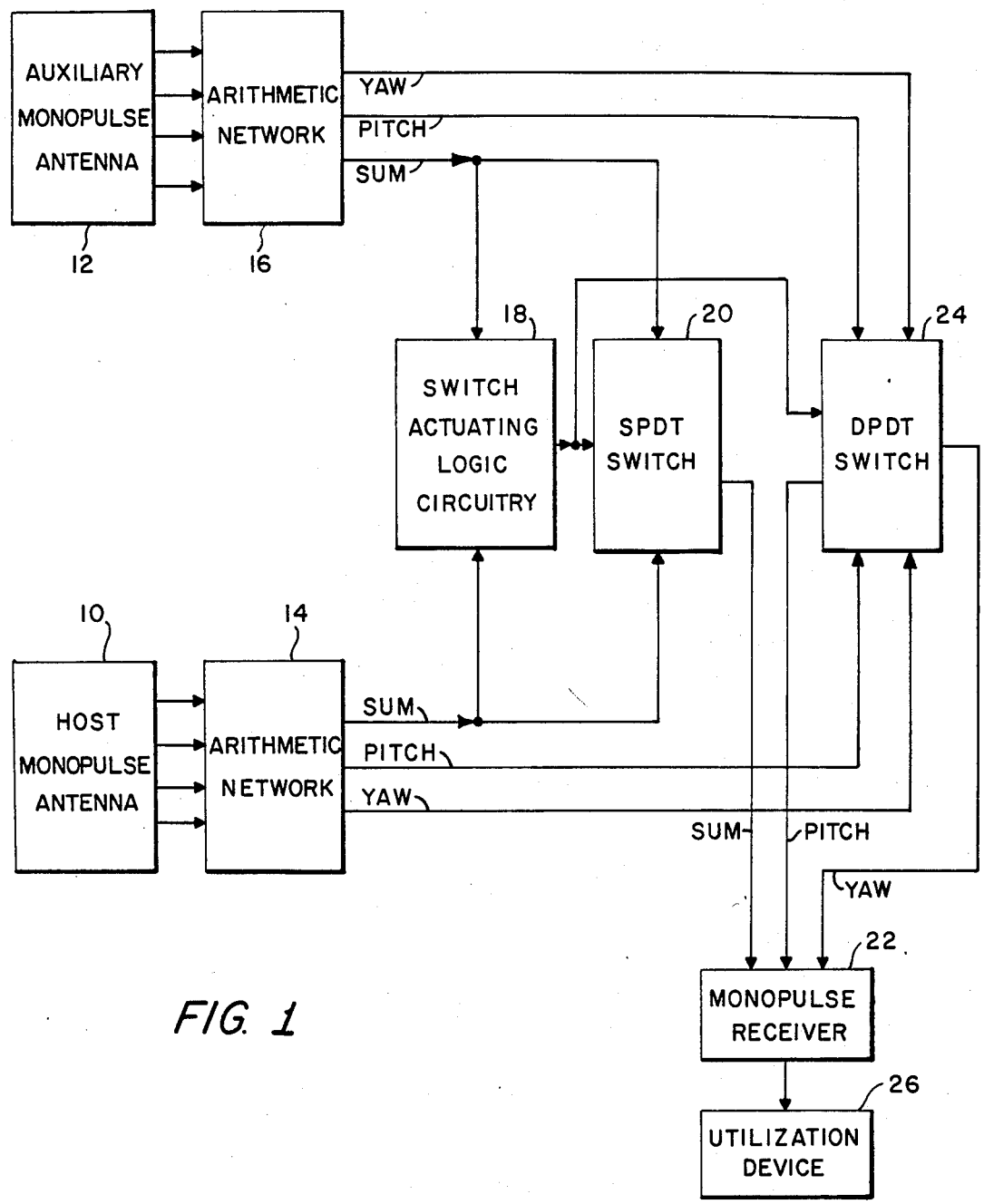
FIG. 1 is a block diagram showing how the contemplated array is intended to be connected in a monopulse receiver.

Referring now to FIG. 1, it may be seen that a first antenna (referred to sometimes hereinafter as host monopulse antenna 10) and a second antenna (referred to sometimes hereinafter as auxiliary monopulse antenna 12) feed, respectively, conventional arithmetic networks 14, 16 so as to produce sum, pitch and yaw signals, as shown. The relevant details of construction and assembly of the host monopulse antenna 10 and auxiliary monopulse antenna 12 will be described hereinafter in connection with FIGS. 2 and 3; suffice it to say here that the elements of the two antennas are orthogonally polarized. That is to say, if the elements of the host monopulse antenna are assumed to be vertically polarized, the elements of the auxiliary monopulse antenna then are horizontally polarized.

The sum signals out of the arithmetic networks 14, 16 are passed, as shown, to switch actuating logic circuitry 18 and a single-pole double-throw switch (SPDT switch 20). The switch actuating logic circuitry 18 is operative to compare the amplitudes of the sum signals and to produce a control signal indicative of the result of such comparison. The SPDT switch 20 then is operative to select, in accordance with the control signal out of the switch actuating logic circuitry 18, the larger one of the sum signals for passage to a monopulse receiver 22. Similarly, the yaw and pitch signals are passed through a double-pole double-throw switch (DPDT switch 24) that is actuated in synchronism with SPDT 20.

The switch activating logic circuitry 18, the SPDT 20 and the DPDT 24 are conventional and therefore need not be described in detail. Briefly, the essential elements of the switch actuating logic circuitry 18 are a peak detector for each of the sum signals and a differential amplifier responsive to the detected signals to produce a signal having a polarity indicative of the relative amplitudes of the sum signals. The SPDT 20 is a P-I-N switching matrix operation in accordance with the polarity of the signal out of the switch actuating logic circuitry 18. The DPDT 24 is a pair of similar P-I-N switching matrices (one receiving the pitch signals and the other the yaw signals out of the arithmetic networks 14, 16) operated in synchronism with the SPDT 20.

The monopulse receiver 22 also is conventional, while the utilization device 26 (not required for an understanding of this invention but shown for the sake of completeness) is the remainder of any seeker in a guided missile.

Figure 2A:
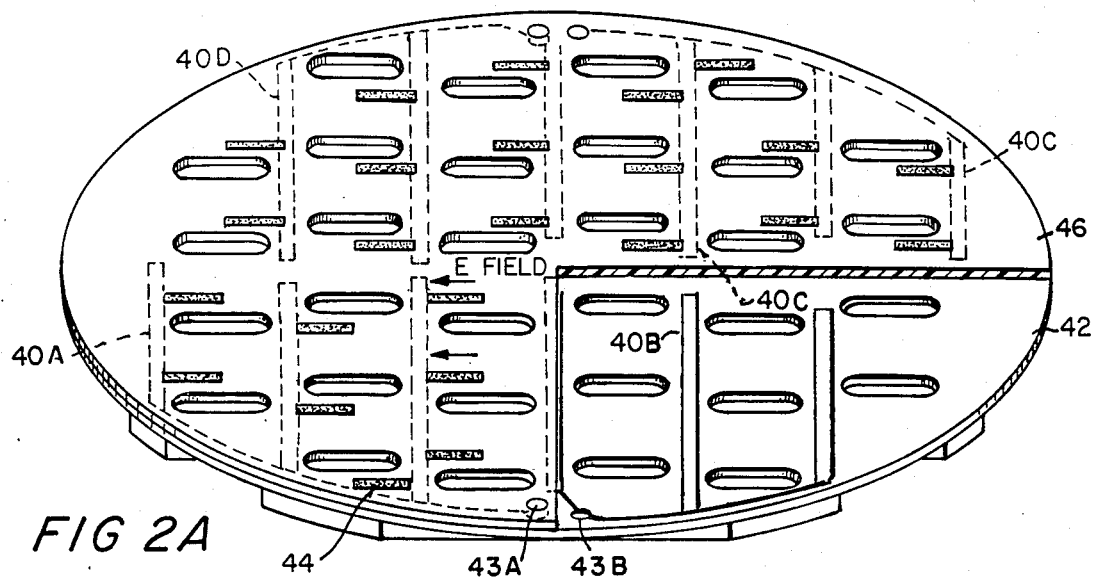
FIGS. 2A and 2B are partially cutaway isometric views of a monopulse antenna according to this invention.
Figure 2B:
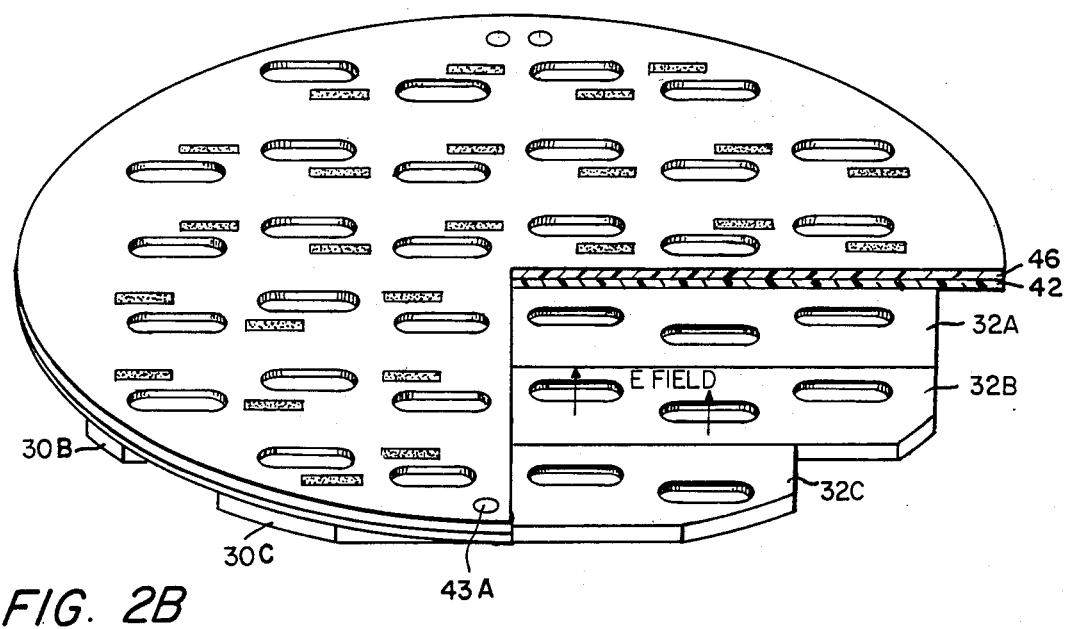

Referring now to FIG. 2B it may be seen that an array of slotted waveguides 30A, 30B, 30C, 32A, 32B, 32C, 34A, 34B, 34C, 36A, 36B, 36C, arranged and fed in a conventional manner to form a monopulse antenna with four quadrants, makes up the host monopulse antenna 10 of FIG. 1. It should be noted that the direction of the E-field at each waveguide slot (not numbered) in each one of the slotted waveguides 30A . . . 36C is parallel to the narrow dimension, i.e. the height, of each one of the slots. For convenience then the host monopulse antenna 10 of FIG. 1 will be referred to as a vertically polarized antenna.

The auxiliary monopulse antenna 12 of FIG. 1 is shown in FIG. 2A to be a capacitively coupled microstrip dipole array made up of four quadrants. The E-field at each one of the dipoles (such as dipoles 44) in the just-mentioned arrays is orthogonal to the direction of the E-field at each slot (not numbered) in the host monopulse antenna 10 of FIG. 1. It follows then that the auxiliary monopulse antenna 12 of FIG. 1 may be conveniently referred to as a horizontally polarized antenna.

The feeds 40A, 40B, 40C, 40D are circuit elements (not numbered) printed in any known manner on a first layer 42 of a dielectric material. As may be seen in FIG. 2A, each one of the feeds 40A, 40B, 40C, 40D is positioned on the first layer 42 so that, when that layer is juxtaposed to the slotted waveguides (only the waveguides in the monopulse sector containing feed 40B being visible in FIG. 2B, such waveguides being identified by the reference numerals 32A, 32B, 32C), none of the circuit elements (not numbered) overlie any of the slots (not numbered) in such waveguides and a conventional "coaxial-to-printed circuit" connection (not shown) may be made through openings (such as openings 43A, 43B) formed in the first layer 42. Slots (not numbered) are formed through the first layer 42, each one of such slots overlying a corresponding one of the slots (not numbered) in the slotted waveguides (such as slotted waveguides 32A, 32B, 32C) when the first layer 42 and such waveguides are juxtaposed. The purpose of these slots in the layer 42 is to minimize any loading effect on the waveguide slots of the host antenna.

The antenna elements of the auxiliary monopulse antenna 12 of FIG. 1 are dipoles, such as that identified by reference numeral 44 in FIG. 2A, printed on a second layer 46. Each one of the dipoles 44 (which here correspond in number to the number of slots in the slotted waveguides 30A . . . 36C) is positioned so that, when the first layer 42, the second layer 46 and the slotted waveguides 30A . . . 36C are juxtaposed: (a) each one of the dipoles 44 is parallel to, but offset from, a corresponding one of the slots (not numbered) in the slotted waveguides 30A . . . 36C; and (b), the feeds 40A, 40B, 40C, 40D are orthogonally disposed with respect to, and capacitively coupled through the second layer 46 to, each of the dipoles 44. Slots (not numbered) are formed through the second layer 46 to overlie the slots (not numbered) in the first layer 42 when the two layers are juxtaposed.

It will be appreciated that the slotted waveguides 30A . . . 36C, the first layer 42 and the second layer 46, when juxtaposed, may be bonded together in any convenient manner to form a unitary antenna structure wherein the mutual coupling between the slots (not numbered) in the slotted waveguides 30A . . . 36C and the feed/dipole combination on the layers 42, 46 is minimal. Further, it will be appreciated that the slots (not numbered) in the layers 42, 46 reduce the effect of such layers on the impedance matching of the host monopulse antenna 10 (FIG. 1) to free space. Still further, it will be appreciated that each one of the feeds 40A . . . 40D is open-circuited one-half wavelength from the nearest dipole. The impedance of each dipole is controlled by adjusting the dipole position relative to its feed line (i.e. perpendicular to the feed line). The illumination pattern of the auxiliary monopulse antenna 12 (FIG. 1) may thereby be adjusted.

Figure 3A:
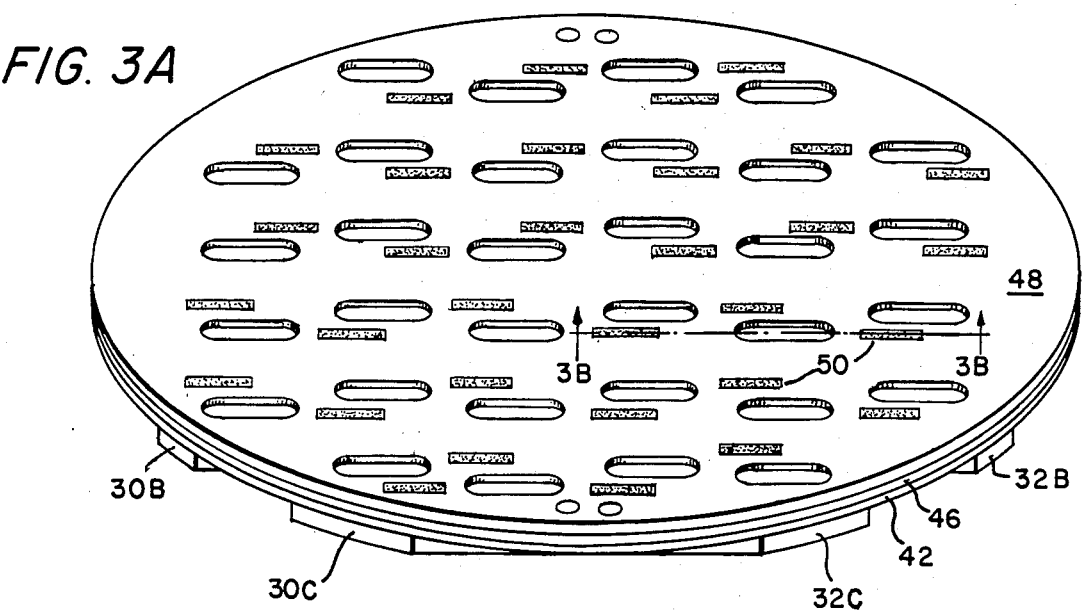
FIGS. 3A and 3B are, respectively, an isometric and a partial cross-section of a modification of the monopulse antenna shown in FIGS. 2A and 2B.
Figure 3B:
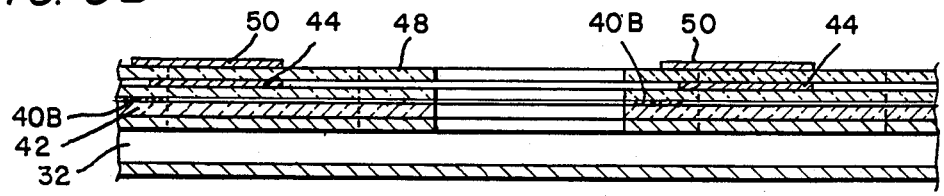

Referring now to FIGS. 3A and 3B, an alternative embodiment of this invention to widen the frequency band of the auxiliary monopulse antenna 12 (FIG. 1) is shown to comprise, in addition to the slotted waveguides 30A . . . 36C, the first and second layers 42, 46 with the previously described printed circuit elements, and a third layer 48 similar to the second layer 46 except that the dipoles (such as the dipoles designated by the reference numeral 50) on the third layer 48 are slightly longer than the dipoles 44 on the second layer 46 to allow capacitive coupling between the feeds 40A . . . 40D on the first layer 42 and the dipoles 50. It will be noted in connection with both FIGS. 2A and 2B and 3A and 3B that the thickness of each one of the layers may be, and preferably is, small in terms of the wavelength at the center frequency of the auxiliary monopulse antenna 12 (FIG. 1). It follows then that the total thickness and weight of the combination of host monopulse antenna 10 (FIG. 1) and auxiliary monopulse antenna 12 (FIG. 1) are approximately the same as the thickness and weight of the former antenna.

Having described preferred embodiments of the invention, it will now be apparent to one of skill in the art that other embodiments incorporating its concept may be used. It is felt, therefore, that this invention should not be restricted to the disclosed embodiment, but rather should be limited only by the spirit and scope of the appended claims.

What is claimed is:

1. In a monopulse receiving arrangement the combination of:
   (a) a first planar array of antenna elements disposed in quadrants, the direction of polarization of each one of the antenna elements in such array being the same;
   (b) a second planar array of antenna elements similarly disposed in quadrants overlying the first planar array, the antenna elements of the second planar array being parallel to, but displaced laterally from, the antenna elements of the first planar array and the direction of polarization of each one of the antenna elements in the second planar array being orthogonal to the direction of polarization of the antenna elements of the first planar array;
   (c) means for forming monopulse sum and difference signals from signals received by the first and the second planar array; and
   (d) means, responsive to the amplitudes of the monopulse sum signals out of the first and the second planar array, for selecting for further processing the monopulse sum and difference signals out of the planar array producing the larger signal.

2. The combination as in claim 1 wherein the first planar array of antenna elements is an array of slots in the wider sides of juxtaposed waveguides, each one of such slots being parallel to the longitudinal axis of its waveguide.

3. The combination as in claim 2 wherein each one of the antenna elements in the second planar array is a dipole printed on a first sheet of a dielectric material.

4. The combination as in claim 3 wherein, additionally, a monopulse feed is printed on a second sheet of a dielectric material, such feed being capacitively coupled through the first sheet of dielectric material to each dipole adjacent an end thereof, such monopulse feed being offset from the slots in the first planar array of antenna elements.

5. The combination as in claim 4 having, additionally, a third planar array of antenna elements comprising a third array having dipoles printed on a third sheet of dielectric material, such dipoles being displaced from the dipoles in the second planar array and from the slots in the first planar array, such dipoles in the third array being capacitively coupled to the monopulse feed on the second sheet of dielectric material.

6. The arrangement as in claim 5 wherein the thickness of each one of the first, second and third sheets of dielectric material is small compared to the wavelength of any signal received by the monopulse receiving arrangement.

7. The arrangement as in claim 6 having, additionally, slots formed through the first, second and third sheets of dielectric material and overlying the slots in the first planar array.

* * * * *